| United States Patent [19] | [11] | 4,107,012 |
|---|---|---|
| Fuhr et al. | [45] | Aug. 15, 1978 |

[54] MONOMER-FREE RESIN COMPOSITIONS, BASED ON UNSATURATED POLYESTERS, WHICH CAN BE CURED BY UV-LIGHT

[75] Inventors: Karl Fuhr, Krefeld; Hans-Joachim Traenckner, Krefeld-Fischeln; Hans Jürgen Rosenkranz, Krefeld; Hans Rufolph, Krefeld-Bockum; Manfred Patheiger, Krefeld-Uerdingen; Artur Haus, Overath, all of Germany

[73] Assignee: Bayer Aktiengesellschaft, Germany

[21] Appl. No.: 354,104

[22] Filed: Apr. 24, 1973

[30] Foreign Application Priority Data

Apr. 29, 1972 [DE] Fed. Rep. of Germany ....... 2221335

[51] Int. Cl.$^2$ ..................... C08G 18/00; C08G 63/00
[52] U.S. Cl. .......................... 204/159.19; 204/159.18; 260/861; 427/54; 428/481; 528/301; 528/304; 528/306; 528/2 M; 528/296

[58] Field of Search ................ 204/159.19, 159.23, 204/159.15, 159.18; 260/860

[56] References Cited

U.S. PATENT DOCUMENTS

| 2,880,152 | 3/1959 | Hiltz et al. ................. 204/159.24 |
| 3,326,710 | 6/1967 | Brodie ......................... 204/159.19 |
| 3,644,568 | 2/1972 | Tilley et al. .................. 260/860 |
| 3,669,716 | 6/1972 | Keyl et al. ................... 204/159.19 |

*Primary Examiner*—Richard B. Turer
*Attorney, Agent, or Firm*—Connolly and Hutz

[57] ABSTRACT

The invention relates to a resin composition that is curable by ultra-violet light, which composition comprises
(a) 10 to 99.7 percent by weight of a polyester that contains $\alpha, \beta$-ethylenically unsaturated dicarboxylic acid radicals and $\beta,\gamma$-ethylenically unsaturated ether groupings, and
(b) 0.3 to 10 percent by weight of a photoinitiator.

9 Claims, No Drawings

MONOMER-FREE RESIN COMPOSITIONS, BASED ON UNSATURATED POLYESTERS, WHICH CAN BE CURED BY UV-LIGHT

It is known that coating compositions which contain unsaturated polyesters of α,β-unsaturated dicarboxylic acids and copolymerisable monomers as well as photoinitiators can be cured by the action of UV-light. In practice, formulations manufactured from them are applied in layers of up to 1 mm, for example on wood, and are cured in a few minutes by passing in front of suitable sources of UV-light. Such systems are described, for example, in DAS 1,694,149. The inhibiting influence of the atmospheric oxygen can firstly be eliminated by adding, to the lacquer formulation, small amounts of paraffin which during the curing process separates out as a thin sealing layer on the surface. Secondly, polyesters which as a result of containing certain ether groupings are no longer subject to the inhibiting influence of the atmospheric oxygen, when dissolved in styrene also cure to a non-tacky product by means of UV-light. Such systems cure, in the irradiation times customary in practice, to give high gloss coatings without having to remove a delustering paraffin film by grinding. Solutions of polyesters of this nature are also described in DAS 1,694,149 and in Patent Application P 21 13 998.0.

As already mentioned, mixtures of polyesters, manufactured using α,β-unsaturated dicarboxylic acids, and styrene, which can be cured with UV-light, find a broad application in the coating of wood and other materials customary in furniture manufacture. The binders employed in the formulations used, and the available UV-light sources demand curing times of 0.5 to 2 minutes, corresponding to the cycle times customary in the wood and furniture industry.

For fields of use where drying within a substantially shorter time matters, the systems described have proved unsuitable even if they were applied as a substantially thinner layer. For example, for use as binders for the numerous possible uses in the printing field, where only a few seconds are available as the curing time, the reactivity is a long way from being sufficient.

Another objectionable fact, for example in the manufacture of a printing ink or a varnish for overlacquering the finished print, based on a polyester resin of α,β-unsaturated dicarboxylic acids, is that these systems contain certain amounts of copolymerisable monomers, as a rule styrene. Such normally relatively volatile vinyl monomers are particularly troublesome since they very easily evaporate in the thin layer to be applied by printing machines, and thereby become objectionable to personnel.

It has now been found, surprisingly, that certain unsaturated polyesters which have been manufactured using α,β-unsaturated dicarboxylic acids and which contain cocondensed α,γ-unsaturated ether groupings can be dried in the presence of photoinitiators in the thin layers customary for printing inks and overlacquering varnishes even without admixture of copolymerisable monomers and that with the polyesters according to the invention the drying to give non-tacky coatings take place within a few seconds if they are irradiated in irradiation installations customary in practice, using mercury high pressure lamps. Thus these resins are particularly suitable for use as binders for UV-light-curing printing inks, overprinting varnishes and paper coating lacquers.

Accordingly, the subject of the invention are UV-light-curable, monomer-free resin compositions capable of flow, which contain 10 to 99.7 per cent by weight of a polyester based on α,β-ethylenically unsaturated dicarboxylic acids and containing β,γ-ethylenically unsaturated ether groupings, 0.3 to 10 per cent by weight of a photoinitiator and, optionally, one or more further resin components compatible therewith.

A further subject of the invention is the use of such compositions for the manufacture of coatings and printing inks.

Unsaturated polyesters in the sense of the invention are condensates which are built up of α,β-ethylenically unsaturated dicarboxylic acids, such as maleic acid, fumaric acid and itaconic acid, and monofunctional and/or bifunctional hydroxy compounds which contain one or more β,γ-ethylenically unsaturated ether groupings in the molecule, for example trimethylolpropane monoallyl ether and/or diallyl ether, glycerine monoallyl ether and/or diallyl ether and pentaerythritol monoallyl ether, diallyl ether or triallyl ether. The molar ratio of β,γ-unsaturated ether groupings to the double bonds of the dicarboxylic acids should preferably be between 0.2 : 1 and 8 : 1.

The dicarboxylic acid component of the condensates according to the invention can be formed, to the extent of up to 50 mol per cent, of the usual saturated aliphatic, cycloaliphatic and/or aromatically unsaturated dicarboxylic acids which are customary in polyester chemistry. For example, phthalic acid, terephthalic acid, isophthalic acid, malonic acid, succinic acid, glutaric acid, adipic acid, norbornenedicarboxylic acid and hexachloronorbornenedicarboxylic acid are suitable for this purpose. Furthermore, all customary polyfunctional alkanols, such as ethylene glycol, 1,2- and 1,3-propanediol, 1,2- and 1,4-butanediol, glycerine, trimethylolpropane, pentaerythritol, neopentylglycol, 1,2-cyclohexanediol, 2,2-bis-(p-hydroxycyclohexylpropane) and 1,4-bismethylolcyclohexane can be used conjointly. However, the conjoint use of ether glycols, such as diethylene glycol, triethylene glycol and tetraethylene glycol, and of the monoalkyl ethers of these glycols, in amounts of 0 to 70 mol per cent relative to the hydroxy components employed, is particularly preferred.

The polyesters according to the invention described in the preceding text can be manufactured according to the customary processes of melt condensation or azeotropic esterification, and in the latter process the catalysts customary for the process and known to an expert can be employed. It may be advisable, from case to case, conjointly to use polymerisation inhibitors, such as hydroquinone, benzoquinone, 3-methylbenzcatechol or metal compounds, in the amounts of 0.001 to 0.1 per cent by weight customary in practice, in the manufacture of the polyesters.

As already explained, the polyesters mentioned are intended to be used in UV-light-curing monomer-free coating compositions. It is therefore obvious that in their manufacture, a consistency is aimed at which permits application by the usual processes. This can be done in the manner familiar to an expert by regulating the molecular weight, for example by choosing a suitable molar ratio of the starting components or by including monofunctional starting components. The molecular weights of the polyesters are generally between 300 and 4,000, preferably between 500 and 2,000.

A low viscosity is particularly to be aimed at if the polyesters according to the invention are to be mixed with other resins which are solid or at least viscous at room temperature. Particularly advantageous combinations result if they are mixed, for example, with other polyesters manufactured using unsaturated fatty acids, namely so-called alkyd resins.

Thus, a preferred embodiment of the invention consists of combining an alkyd resin manufactured using dehydrated castor oil and/or isomerised linseed oil and/or wood oil with low molecular polyesters of maleic acid and/or fumaric acid and hydroxy compounds containing $\beta,\gamma$-unsaturated ether groupings. Such formulations are particularly suitable for the manufacture of UV-light-curing printing inks.

However, a combination with other resins, for example resins listed in the Lacquer Raw Materials Table of Dr. Erich Karsten (4th. edition, 1967, Curt R. Vincentz-Verlag, Hanover) is possible. Where miscibility exists and the resins added do not delay the curing process through the presence of inhibiting groups, for example phenolic OH groups, such additives, which can amount to as much as 89.7 per cent by weight of the mixture, can be employed to optimise the UV-curing resin compositions.

The use of photoinitiators is essential for achieving a reactivity of these compositions which is usable in practice. The photoinitiators are in general used in amounts of about 0.3 to 10 per cent by weight, calculated relative to the resin composition of polyesters, optionally further resin components, and photoinitiators.

For this purpose, the following compounds are preferably employed:

(a) benzoin and its derivatives, especially benzoins of the following formula I

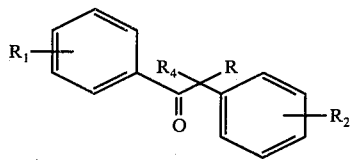

wherein
R denotes H, alkyl, aryl, aralkyl, hydroxymethyl, and sulphonic acid esters of the hydroxymethyl grouping,
$R_1$ and $R_2$ denote hydrogen, lower alkyl with 1 to 4 carbon atoms, alkoxy or halogen,
$R_4$ denotes —O—Y or S—Y and
Y denotes alkyl, aryl aralkyl, trimethylsilyl and H; alkyl-radicals are e.g. $C_1$–$C_8$-n-alkyls such as methyl, ethyl, n-propyl, n-butyl, n-pentyl, n-hexyl, n-heptyl and n-octyl, $C_3$–$C_7$-isoalkyls such as isopropyl, 2-butyl, 2-pentyl, 3-pentyl, 2-hexyl, 3-hexyl, 3-(2.4-dimethyl-pentyl) and 3-(2-methyl-pentyl), and $C_5$–$C_7$-cycloalkyls such as cyclopentyl, cyclohexyl and cycloheptyl;
aryl-radicals are e.g. phenyl, naphthyls, aryl radicals substituted by $C_1$–$C_4$-alkyls such as 4-methyl-phenyl, 2-methyl-phenyl, 4-ethyl-phenyl, 2-ethyl-phenyl, 4-propyl-phenyl, 4-isopropyl-phenyl, 4-(n-butyl)-phenyl, 4-(2-butyl)-phenyl and 4-(tert-butyl)-phenyl, aryl radicals substituted by $C_1$–$C_4$-alkoxyls such as 2-methoxy-phenyl, 4-methoxyl-phenyl, 2-ethoxy-phenyl and 4-ethoxyphenyl;
aralkyl radicals are e.g. $C_8$–$C_{11}$-aralkyls such as phenethyl; R may also be benzyl;
sulphonic acid esters of the hydroxymethyl grouping are radicals of the formula —$CH_2$—O—$SO_2$—$R_5$, e.g. such radicals wherein $R_5$ is methyl, ethyl, n-propyl, isopropyl, n-butyl, isobutyl, 2-butyl, phenyl, tolyl, $\alpha$-naphthyl and $\beta$-naphthyl.

(b) benzophenones, especially those of the general formula II

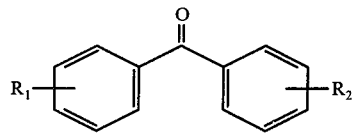

wherein
$R_1$ denotes $CH_2$—X; CH—$X_2$; $CX_3$;
$R_2$ denotes H; $CH_3$; $CH_2$—X; CH—$X_2$; $CX_3$ and
X denotes chlorine, bromine or iodine.

In principle it is however also possible to use the remaining photoinitiators known from the literature, such as benzophenone, aromatic sulphochlorides, phenacyl bromide, aromatic disulphides or anthraquinone derivatives.

Examples of suitable initiators are disclosed in Offenlegungsschriften Nos. 1,769,168, 1,769,853, 1,769,854, 1,807,297, 1,807,301 and 1,919,678 and in DAS 1,694,149.

As special examples there may be mentioned: benzoin methyl ether, ethyl ether, sec.-butyl ether, n-propyl ether, isopropyl ether, butyl ether, isobutyl ether and phenylether; $\alpha$-methylbenzoin methyl ether, $\alpha$-phenylbenzoin ethyl ether, $\alpha$-phenylbenzoin methyl ether, $\alpha$-allylbenzoin ethyl ether, $\alpha$-benzylbenzoin ethyl ether, $\alpha$-hydroxymethylbenzoin and $\alpha$-hydroxymethylbenzoin isopropyl ether, $\alpha$-acetoxymethylbenzoin isopropyl ether, 4-benzoyl-4-phenyl-1,3-dioxolane, $\alpha$-($\beta$-cyanoethyl)-benzoin ethyl ether and $\alpha$-($\beta$-carboxyethyl)-benzoin and $\alpha$-($\beta$-carboxyethyl)-benzoin ethyl ether; $\alpha$-($\beta$-carboxyethyl)-benzoin alkyl ethers and their salts; benzoin trimethylsilyl ether, $\alpha$-methylbenzoin trimethylsilyl ether, $\alpha$-ethylbenzoin trimethylsilyl ether, $\alpha$-phenylbenzoin trimethylsilyl ether, 4,4'-dimethylbenzoin trimethylsilyl ether, 4,4'-dimethoxybenzoin trimethylsilyl ether and sulphonic acid esters of $\alpha$-hydroxymethylbenzoin. Further, 2-phenyl-thio-2-phenylacetophenone, 2-phenyl-thio-acetophenone and 2-n-butylthio-2-phenyl-acetophenone.

Equally, there should be mentioned compounds according to DOS No. 1,949,010, such as p-benzoylbenzyl chloride, p-benzoylbenzal chloride, p-benzoylbenzotrichloride, p-benzoylbenzyl bromide, p-benzoylbenzal bromide, p-benzoylbenzotribromide, 4,4'-bischloromethylbenzophenone, 4,4'-bis dichloromethylbenzophenone, 4,4'-bistrichloromethylbenzophenone, 4,4'-bisbromomethylbenzophenone, 4,4'-bisdibromomethylbenzophenone, 4,4'-bistribromomethylbenzophenone and o-benzoylbenzotrichloride. Mixtures of these compounds can also be used.

Depending on the requirements of the end use, the UV-light-curing resin compositions according to the invention can contain additives.

For example, the customary fillers, such as silica, talc, chalk, gypsum and baryte can be employed without hindering the photoreaction. If the compositions are to be used as binders for UV-light-curing printing inks, the pigments customary for this purpose, such as organic pigments of the azo series (see Ullmanns Enzyklopädie der techn. Chemie (Ullmann's Encyclopaedia of Industrial Chemistry), volume 13, page 806, 1952); complex pigment dyestuffs (see Ullmanns Enzyklopädie der techn. Chemie (Ullmann's Encyclopaedia of Industrial Chemistry), volume 13, page 809); anthraquinone dyestuffs (see Ullmanns Enzyklopadie der techn. Chemie (Ullmann's Encyclopaedia of Industrial Chemistry), volume 13, page 693, 1952) and quinacridone pigments, inorganic pigments, such as titanium dioxide, iron, cadmium, chromium and zinc pigments as well as carbon black can be employed in the amounts customary in practice.

UV absorbers, further stabilisers and organic peroxides can be used conjointly if demanded by the end use.

The addition of driers, such as the metal naphthenates and metal chelates usually employed, leads to an advantageous acceleration of the curing process.

The resin compositions according to the invention can be applied by means of the customary application processes, such as by roller-application, knife-coating and surface-filling, or by printing on the machines customary for the purpose. At times, an addition of small amounts of volatile solvents can facilitate the application. Such an application is also indicated if coating is effected by casting or a manual method of application by means of a brush is used. In all these application processes, a dry layer thickness of about 50 $\mu$ should not be exceeded. However, the resin compositions according to the invention are preferably employed in the layer thicknesses of a few $\mu$ which are customary in the printing trade. When used in this way, they are suitable for the coating or printing of paper, cardboard, wood, leather, textiles, metal, glass, ceramic, stones and plastics.

The examples which follow are intended to explain the invention in more detail; the parts indicated therein are parts by weight.

EXAMPLE 1

2 552 parts of fumaric acid and 451 parts of 1,2-propylene glycol are slowly heated to 150° C whilst passing nitrogen over the mixture. 1,441 parts of diethylene glycol, 941 parts of trimethylolpropane diallyl ether, 428 parts of diethylene glycol monobutyl ether and 0.34 part of hydroquinone are added at this temperature. The internal temperature is raised to 180° C at the rate of 10° C per hour and condensation is carried out until 98% of the theoretical amount of water have been liberated.

Measurements of the viscosity and acid number also permit good control of the state of the esterification. The condensation is best stopped at a viscosity of 19.5 seconds in the DIN-4 cup (50% strength in styrene) or at an acid number of 30 (OH number 80).

EXAMPLE 2

2,320 parts of fumaric acid and 334 parts of 1,2-propylene glycol are heated to 150° C whilst passing nitrogen over the mixture. Thereafter, 1,136 parts of diethylene glycol, 268 parts of trimethylolpropane, 1,648 parts of trimethylolpropane diallyl ether and 0.620 part of hydroquinone are added and the temperature is raised to 180° C at the rate of 10° C per hour. Esterification is carried out at this temperature until 96% of the theoretical amount of water has been liberated. The condensation is stopped at a viscosity of 19.5 seconds in the DIN-4 cup (50% strength in styrene).

EXAMPLE 3

2,320 parts of fumaric acid and 334 parts of 1,2-propylene glycol are heated to 150° C in a nitrogen atmosphere. Thereafter, 1,136 parts of diethylene glycol, 272 parts of pentaerythritol, 1,648 parts of trimethylolpropane diallyl ether and 0.62 part of hydroquinone are added and the internal temperature is raised to 180° C at the rate of 10° C per hour. Condensation is carried out at this temperature until the viscosity of the polyester has reached 19.5 seconds in the DIN-4 cup (50% strength in styrene).

EXAMPLE 4

The polyesters from Examples 1 to 3 are mixed with 5 per cent by weight of the various photoinitiators, knifecoated by means of a Handcoater No. 2 onto white cardboard sheets and irradiated at a distance of 8 cm with a Philips HTQ 70 mercury high pressure lamp, and the time to achieve complete non-tackiness is measured. The following times were obtained for the individual photoinitiators:

Table

Times in seconds to reach non-tackiness.
Addition of 5 per cent by weight of the photoinitiators

| Resin No. | Hydroxymethylbenzoin methanesulphonate | Benzoin isopropyl ether | Benzoin ethyl ether | p-Benzoylbenzal chloride |
|---|---|---|---|---|
| 1 | 15 | 6 | 7 | 4 |
| 2 | 10 | 4 | 5 | 3 |
| 3 | 11 | 5 | 6 | 4 |

EXAMPLE 5

32 parts of a product of 196 g of maleic anhydride (2 mols), 174 g of trimethylolpropane monoallyl ether (1 mol) and 426 g of trimethylolpropane diallyl ether (2 mols), obtained by azeotropic esterification in toluene with the addition of catalytic amounts of $H_2SO_4$, are mixed with 64 parts of an alkyd resin from 4,690 g of castor oil, 928 g of glycerine and 1,810 g of phthalic anhydride which has been condensed at 260° to 240° C, whilst passing nitrogen through the mixture, until a viscosity of 140 to 180 seconds (measured in a 50% strength solution in white spirit, DIN cup No. 4 at 20° C) and an acid number of less than 12 has been reached, and with 4 parts of p-benzoylbenzal chloride. The resin formulation thus obtained is ground on a triple-roll mill with 25 parts of a blue pigment dyestuff (BAYER, Heliogen Blue LBGN, Colour Index Part 1, Pigment Blue 15, Part 2, Pigment Blue 74,160) and with 1.5 parts of drier (10% strength cobalt, lead, manganese naphthenate solution in toluene). The printing ink thus obtained is printed onto art printing paper on a letterpress printing machine (Heidelberger Schnellpresse). The print is irradiated from a distance of 5 cm with a mercury high pressure lamp (type Philips, HTQ 4, 1000 watt) for 2 seconds. Dry, nonsmudging prints of good gloss are obtained.

EXAMPLE 6

If 25 parts of an esterification product from a 1-molar amount of maleic acid and a 2-molar amount of trimethylolpropane diallyl ether as well as 5 parts of 4,4'-bisdichloromethylbenzophenone are added to 70 parts of the alkyd resin from Example 5 and a printing ink is prepared from this mixture, as described in Example 5, the prints produced therewith dry in 2.5 seconds under a mercury high pressure lamp (type Philips, HTQ 4, 1000 watt) at a distance of 5 cm. The prints are non-smudging and are distinguished by good gloss.

EXAMPLE 7

80 parts of the polyester resin according to Example 2 are mixed with 30 parts of an esterification product of 1 mol of maleic acid and 2 mols of trimethylolpropane diallyl ether. After adding 5.5 parts of 4,4'-dichloromethylbenzophenone the resin is applied by means of a roller combination onto printed paper sheets. Thereafter it is irradiated with a Philips HTQ 70 mercury high pressure lamp for 3 seconds. Following this, the print is protected by a solvent-resistant, very glossy and colourless coating.

What we claim is:

1. A resin composition which is curable by ultraviolet light, said composition comprising
   (a) as the sole curable component, 10 to 99.7% by weight of a polyester having a molecular weight of 300 to 4,000 and containing α,β-ethylenically unsaturated dicarboxylic acid radicals and β,γ-ethylenically unsaturated ether groupings, the molar ratio of the β,γ-unsaturated ether groupings to the double bonds of the dicarboxylic acid radicals being from 0.2:1 to 8:1 and (b) 0.3 to 10% by weight of a photoinitiator.

2. A composition according to claim 1 which includes an alkyd resin component based on an unsaturated fatty acid.

3. A composition according to claim 1, in which the polyester (a) comprises at least 50 mole per cent of α,β-ethylenically unsaturated dicarboxylic acid radicals incorporated by condensation.

4. A composition according to claim 1, in which the polyester (a) has a molecular weight of 500 to 2,000.

5. A composition according to claim 1, in which the photoinitiator (b) is a benzoin of the general formula

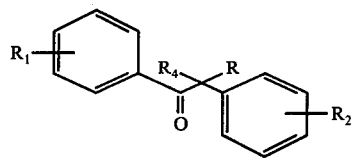

I in which
   R is hydrogen, alkyl, aryl, aralkyl, hydroxymethyl or a sulphonic acid ester derivative of hydroxymethyl,
   $R_1$ and $R_2$ are each hydrogen, alkyl with 1 – 4 carbon atoms, alkoxy or halogen,
   $R_4$ is —O—Y or —S—Y, and
   Y is alkyl, aryl, aralkyl, trimethylsilyl or hydrogen,
or a benzophenone of the general formula

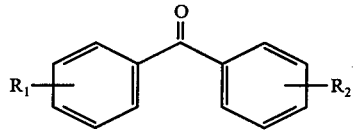

II in which
   $R_1$ is —$CH_2X$, —$CHX_2$ or —$CX_3$,
   $R_2$ is hydrogen, methyl, $CH_2X$, $CHX_2$ or $CX_3$, and
   X is chlorine, bromine or iodine.

6. A composition according to any of claim 1, which further comprises, as a drying agent, a metal naphthenate or metal chelate.

7. A composition according to any of claim 1, which further comprises a filler, dyestuff or pigment.

8. A method of producing a cured resin, which method comprises irradiating a composition of claim 1 with ultra-violet light.

9. A coating or printing ink produced from a composition according to claim 1.

* * * * *

UNITED STATES PATENT AND TRADEMARK OFFICE
CERTIFICATE OF CORRECTION

PATENT NO. : 4,107,012
DATED : August 15, 1978
INVENTOR(S) : Fuhr et al

It is certified that error appears in the above—identified patent and that said Letters Patent are hereby corrected as shown below:

Data Identifier [75], line 4 thereof, "Rufolph" should read -- Rudolph --.

Signed and Sealed this

Twenty-seventh Day of March 1979

[SEAL]

Attest:

RUTH C. MASON
Attesting Officer

DONALD W. BANNER
Commissioner of Patents and Trademarks